(No Model.)
W. H. & J. BUTTERWORTH.
THRESHING MACHINE.
No. 603,424. Patented May 3, 1898.
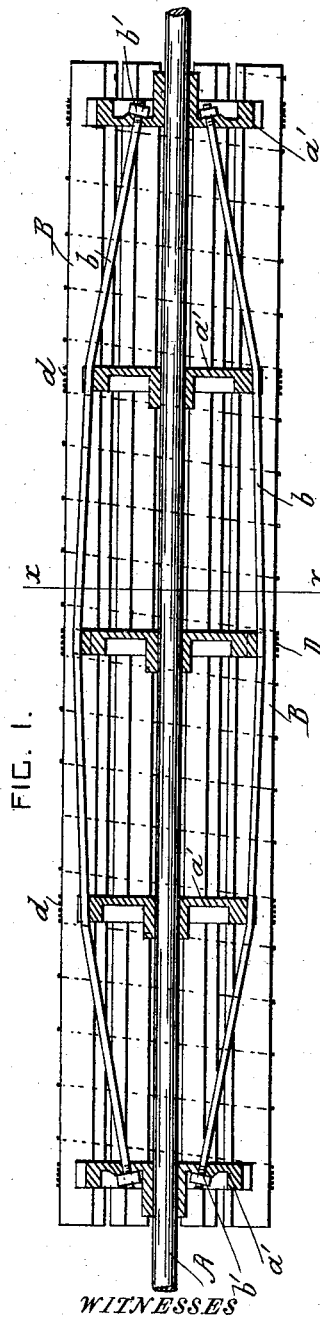
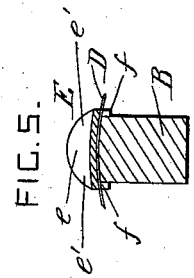
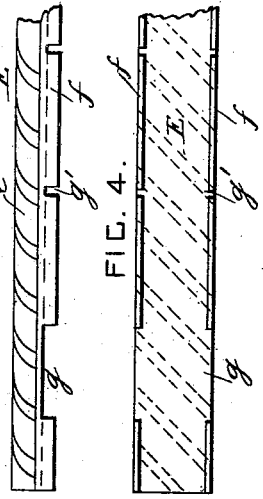
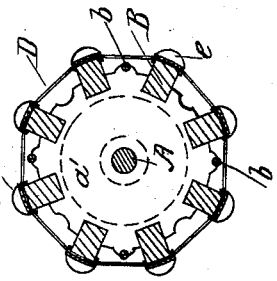
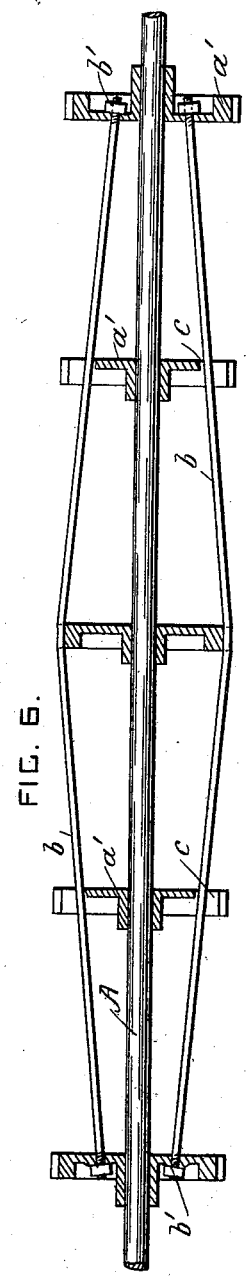
WITNESSES
J. O. Johnson
W. E. Abbott
INVENTORS
William H. Butterworth
and John Butterworth
by Herbert W. T. Jenner, Attorney
THE NORRIS PETERS CO., PHOTO-LITHO., WASHINGTON, D. C.

UNITED STATES PATENT OFFICE.

WILLIAM H. BUTTERWORTH AND JOHN BUTTERWORTH, OF TRENTON, NEW JERSEY.

THRESHING-MACHINE.

SPECIFICATION forming part of Letters Patent No. 603,424, dated May 3, 1898.

Application filed September 24, 1897. Serial No. 652,854. (No model.)

*To all whom it may concern:*

Be it known that we, WILLIAM H. BUTTERWORTH and JOHN BUTTERWORTH, citizens of the United States, residing at Trenton, in the county of Mercer and State of New Jersey, have invented certain new and useful Improvements in Threshing-Machines; and we do hereby declare the following to be a full, clear, and exact description of the invention, such as will enable others skilled in the art to which it appertains to make and use the same.

This invention relates to the cylinders of threshing-machines; and it consists in the novel construction and combination of the parts hereinafter fully described and claimed.

In the drawings, Figure 1 is a longitudinal section through a cylinder constructed according to this invention. Fig. 2 is a cross-section taken on the line $x\ x$ in Fig. 1. Fig. 3 is a side view of a portion of one of the threshing-plates. Fig. 4 is a plan view from below, and Fig. 5 is a cross-section through the threshing-plate. Fig. 6 is a longitudinal section through the cylinder, showing a modification.

A is the cylinder-shaft, and $a'$ are heads secured on the said shaft.

B are the longitudinal bars or staves, which are secured in recesses in the heads $a'$. Any desired number of heads may be used, according to the length of the cylinder, and in order to stiffen the cylinder and keep the middle portion of it from sagging a series of truss-rods $b$ is provided. Three or more of these truss-rods may be secured in the cylinder at equal distances apart. The middle portion of each truss-rod rests upon the periphery of the head in the middle of the cylinder, and its ends are inclined toward the shaft and pass through holes near the hubs of the heads at the ends of the cylinder. The end portions of the truss-rods are screw-threaded and are provided with nuts $b'$ for securing them under tension.

The truss-rods bear upon the intermediate heads in the form of cylinder shown in Fig. 1, so that they have different inclinations at different parts of their length. In the modification shown in Fig. 6 the intermediate heads are provided with long slots $c$, which clear the truss-rods and permit the truss-rods to extend in a straight line between the middle head and each end head.

In order to prevent the cylinder-bars from being displaced when the cylinder is revolved rapidly, the periphery of the cylinder is wound with a spiral band D. This band is preferably a round wire band; but it may be of any approved cross-section. The ends of the band are secured to the cylinder in any approved manner. The band is wound in close adjacent coils $d$ at certain places on the length of the cylinder, and between the series of close adjacent coils $d$ the band is wound in widely-separated coils of a prearranged and preferably uniform pitch. A single continuous band is preferably used, as it only has to be fastened twice to the cylinder, once at each end; but the band is not necessarily continuous, and more than one band may be used.

E are the threshing or rubbing plates, which are secured to the bars B. The long cylinder is used for threshing rye, and the threshing-plates E are preferably provided with diagonal ribs or corrugations $e$ on their faces. In order that the threshing-plates may wear longer, they are made reversible, and the ribs $e$ have similarly-curved portions $e'$ at each end when ribs are provided. The threshing-plates are also provided with two flanges $f$, projecting over the edges of the bars B and having rounded corners. The threshing-plates are secured to the bars B in any approved manner and the coils of the spiral band are clamped between the said threshing-plates and bars. The flanges $f$ of the threshing-plates are provided with wide notches $g$ for the passage of the close adjacent coils of the spiral band and narrow notches $g'$ for the passage of the intervening coils. When one side of the threshing-plates becomes worn, they can be turned around, so as to bring the other side foremost, or, if preferred, the cylinder can be turned end for end in its bearings.

What we claim is—

1. The combination, with a threshing-cylinder; of a continuous spiral band wound on the periphery of the cylinder and comprising series of close adjacent coils and separated coils arranged alternately, substantially as set forth.

2. The combination, with a threshing-cylinder; of a continuous spiral band wound on the periphery of the cylinder and comprising series of close adjacent coils and separated coils arranged alternately, and threshing-plates secured to the cylinder over the said band and provided with flanges having broad notches and narrow notches fitting over the coils of the band, substantially as set forth.

3. The combination, with a threshing-cylinder, of means for supporting the same comprising close adjacent metallic coils and separated metallic coils wound spirally upon the periphery of the cylinder, substantially as set forth.

4. The combination, with a threshing-cylinder, of means for supporting the same comprising metallic coils wound spirally on the periphery of the cylinder, and plates secured to the cylinder and provided with notched flanges engaging with the said coils, substantially as set forth.

In testimony whereof we affix our signatures in presence of two witnesses.

WILLIAM H. BUTTERWORTH.
JOHN BUTTERWORTH.

Witnesses:
GEO. F. SCHEELE,
WALTER K. BOWNE.